May 28, 1968 PER ØYSTEIN WINSNES 3,384,922
ARRANGEMENT FOR THE PRODUCTION OF MOLDED OBJECTS OF
FIBER MATERIAL, WOOD CHIPS OR OTHER MATERIALS
Filed Nov. 26, 1965
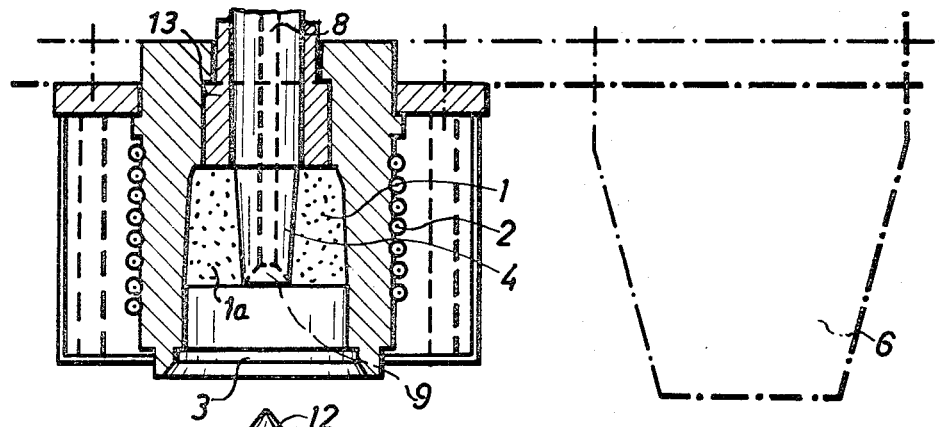
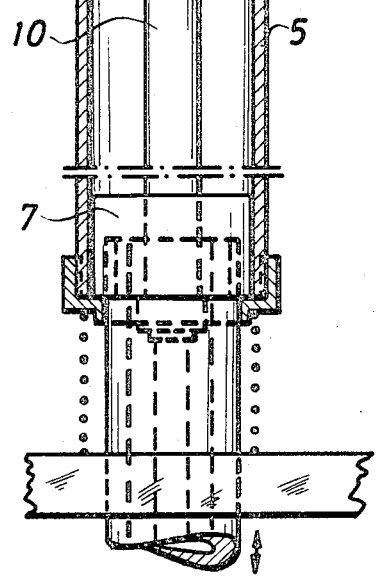
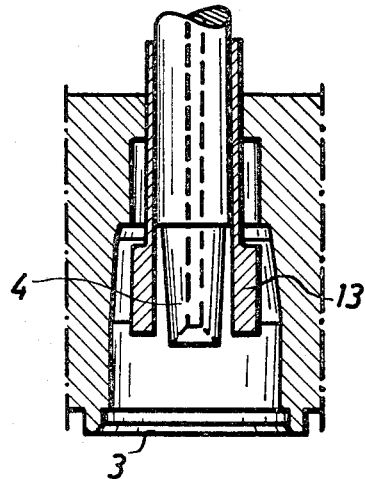
INVENTOR
PER ØYSTEIN WINSNES
BY Young + Thompson
ATTORNEYS

United States Patent Office 3,384,922
Patented May 28, 1968

3,384,922
ARRANGEMENT FOR THE PRODUCTION OF MOLDED OBJECTS OF FIBER MATERIAL, WOOD CHIPS OR OTHER MATERIALS
Per Øystein Winsnes, Askerveien 47, Asker per Oslo, Norway
Filed Nov. 26, 1965, Ser. No. 509,927
Claims priority, application Norway, Nov. 25, 1964, 155,727
6 Claims. (Cl. 18—5)

ABSTRACT OF THE DISCLOSURE

A mold for molding objects under heat and pressure has an escape outlet for gas from the mold cavity. The mold cavity is defined by separable sections which between them define the outlet. When the sections are separated, the outlet is opened, so that material that extrudes into the outlet during molding will not prevent ejection of the object. Specifically, a tap that forms a hole through the object encounters a mandrel having ridges and grooves that define outlet openings with the tap, the tap being centrally bored to let the gas out.

---

The present invention relates to an arrangement for the production of molded objects of fiber material, wood chips or similar materials, to which is preferably added a binder which sets in a mold wherein the material is pressed, the setting being effected by heating.

In the usual methods a predetermined amount of material is introduced into a mold whereafter the mass is compressed by a piston to the desired size of the finished object, and in such a way that the mold is completely filled by the mass. One disadvantage of the arrangements used for such production of pressed molded objects is that the means for the feeding of the predetermined amount of material is extremely complicated and the container for the material mass must necessarily be small, and this container is intended to be tilted when the material is introduced into the mold. In addition to the complication of the actual feeding or filling mechanism there is also often the problem of very uneven filling, since the main portion of the mass may come to rest on one side of the mold. The aim of the present invention is to abolish this disadvantage by providing an arrangement which allows a much simpler construction of the production machinery, and which avoids an uneven distribution of the mass in the mold. A further aim of the invention is to provide the possibility of an outlet for the gas and/or steam which must escape during the operation.

Various methods have previously been used for the outlet of steam, e.g. through perforations. Since, however, the objects are to be produced by compressing the mass, i.e. under quite a significant pressure, the mass is apt to be forced into the perforations, so that on the one hand these perforations become closed, and on the other hand the finished object has a pattern which corresponds to the perforations.

This disadvantage is also avoided according to the present invention, since the gas and/or steam may escape without causing the mass to follow after, and with no resulting pattern being imparted to the objects by the openings through which the gas escapes. Even if some few fiber particles were to enter the outlet openings for the gas or steam this would entail no pause in the production for cleaning since one may say that the openings clean themselves on the production of each object.

The invention thus relates to an arrangement for the production of molded objects of fiber material, wood chips or similar material by the use of a mold for pressing the objects, and it is substantially characterized in that the opening of the mold faces downwardly towards a cylinder for containing a predetermined amount of starting material and this cylinder comprises a piston for forcing the starting material from the cylinder into the mold.

The invention is further characterized in that a mandrel is mounted in the cylinder, the end of which mandrel is adapted to bear against one opening in the mold, and a characteristic feature of the invention is, moreover, that the said opening is formed by the end of a bore in a tap located in the mold for the formation of a hole in the molded object to be produced. This bore is for the escape of gas and/or steam.

In a preferred embodiment of the invention the mold is characterized by being provided with heating means for heating the compressed object, in that the mold encompasses the piston when the piston is in raised position for transfer of heat to said piston and thereby to the underside of the object.

The said opening may be conical moreover, the mandrel ending in a corresponding conical point having grooves for the escape of steam and gas.

In the preferred embodiment the mold is further provided with a movable portion which forms an ejection piece for the pressed molded object.

An example of the invention is more closely described in the following with reference to the drawing, where, FIG. 1 shows a section through a detail of a pressing arrangement for the production of molded objects in accordance with the invention, and FIG. 2 shows the mold with movable parts displaced for the ejection of a finished molded object.

In FIG. 1 it can be seen that the mold 1, heated by heating element 2, is positioned with opening 3 facing downwardly. In the shown example hollow plugs 1a, e.g. for use in paper rolls, are to be pressed, and in order to achieve holes in the plug, a tap-like projection 4 is disposed in the mold 1. When the pressing of the plug 1a is completed it has the shape shown in FIG. 1.

In order to introduce into the mold 1 the correct quantity of material to be compressed, a cylinder 5 of suitable size and internal dimension which fits the open end of the mold 1, is disposed beneath said mold. The term cylinder describes here an elongated tubular container, having a cross section other than circular. The cylinder 5 is filled from storage container or other suitable feeding arrangement which is generally designated as 6 in FIG. 1, whereafter the said cylinder is disposed beneath the mold 1. A movable piston 7 is located within the cylinder, said piston being adapted to be passed up through the cylinder 5, by means of an arrangement not shown, and to force the contents of the cylinder into the mold 1 subsequent to the piston being raised and brought to bear sealingly against the rim of the opening 3 of the mold 1. The mass which is then in the cylinder 5 is compressed to the plug 1a in the mold 1. With many types of material masses it is important that air, gas, and steam may escape, and this applies particularly when wood chip material and suitable binders are used. This material is particularly advantageous in the production of plugs for paper rolls. Subsequent to the piston 7 having compressed the mass to the object shown in the mold 1, the piston will remain in the downwardly directioned extension of the mold 1, in close contact with the walls of said mold, and heat is transmitted from the mold 1 and its heating element 2, to the piston 7 which thereby constitutes a heated bottom to the mold during the time the setting of the binder takes place.

In the illustrated example a very practical measure has been found for the escape of air, gas and steam, in that a bore 8 is located in the center part of the mold in the extension of the projection 4, said bore ending in a conical outlet 9. In order to assist in the formation of the hole in the plug a central mandrel 10 is mounted in the cylinder 5, the upper end 11 of which mandrel is contacted by the end of the projection 4, in the mold 1, when the cylinder 5 is raised. The end 11 is, at 12, formed conically, corresponding to the outlet 9 of the bore 8 in the projection 4, and the conical point 12 is provided with radial grooves leading into the bore 8 from the space in the mold 1 when the projection 4 and the mandrel 10 are brought to bear against each other. Steam and air which is forced out of the wood chip material may escape here, and by drawing the mandrel 10 out of the projection 4 each time a new plug is pressed, the conical point 12 may readily be cleaned if necessary, if it is not self-cleaned when the material for the next plug is emptied from the feeding arrangement 6 into the cylinder 5 downwardly over the point 12.

The air and gas outlet through the grooves and the point 12 will cause no objectionable pattern in the plug 1, since the grooves are located exactly at the edge, at the end of the projection 4 where, in any case, there is the possibility of a small burr.

In order to withdraw the finished plug, the upper portion of the mold 1 is formed by a displaceable sleeve 13 which may be moved from the position shown in FIG. 1 to the position shown in FIG. 2 for the ejection of the plug when this is finished.

The illustrated embodiment is disclosed only as a non-limiting example, since other embodiments may be possible for pressing of other objects and with other details according to the material used in each individual case.

What is claimed is:

1. A mold for molding objects, comprising means defining a mold cavity, said means including a central tap that forms a hole through the molded object, an elongated mandrel aligned with the tap and having an end engageable with the end of the tap, said tap and mandrel having smooth imperforate surfaces that meet each other and that bound at least a portion of the mold cavity, means mounting one of the tap and mandrel for movement relative to the other of the tap and mandrel between an open mold position in which the tap and mandrel are spaced from each other and a closed mold position in which the ends of the tap and mandrel engage each other, the ends of the tap and mandrel defining between them at least one passageway for the escape of gas from the mold cavity, said passageway opening into the mold cavity at the junction of said meeting surfaces, and a plunger that closely slidably encompasses the mandrel and that is movable lengthwise of the mandrel into the mold cavity from an initial position in which it is spaced from the tap to a final position in which it is disposed at said junction of said meeting surfaces so that at the end of the plunger stroke said passageway opens into a corner of the mold cavity defined by the tap and the plunger.

2. A mold as claimed in claim 1, one of said tap and mandrel having an endwise opening therethrough for the escape of gas, one of said tap and mandrel having at least one groove in its said end, said groove communicating between the mold cavity and said endwise opening.

3. A mold as claimed in claim 2, said at least one groove being disposed on a conical end surface of its associated one of said tap and mandrel, the other of said tap and mandrel having a complementary recessed conical surface on its said end, said endwise opening terminating at the apex of the first-named said conical surface.

4. A mold as claimed in claim 1, the tap having an endwise opening therethrough for the escape of gas, the mandrel having at least one groove in the surface that contacts the end of the tap, said groove communicating between the mold cavity and the tap opening.

5. A mold as claimed in claim 4, said at least one groove on the mandrel being disposed on a conical end surface of the mandrel, said tap having a complementary recessed conical surface on its end that contacts the mandrel, the opening through said tap terminating at the apex of said conical surface on the tap.

6. A mold as claimed in claim 5, there being a plurality of said grooves on said conical end surface of the mandrel, said grooves converging toward the apex of the conical end surface of the mandrel.

References Cited

UNITED STATES PATENTS

| | | |
|---|---|---|
| 792,452 | 6/1905 | Queneau. |
| 1,745,482 | 2/1930 | Goodwin. |
| 1,826,945 | 10/1931 | McKay et al. |
| 2,017,216 | 10/1935 | Marcus. |
| 2,335,879 | 12/1943 | Ott _____ 18—5 X |
| 2,724,147 | 11/1955 | Glover. |
| 2,744,288 | 5/1956 | Fienberg et al. |
| 2,870,484 | 1/1959 | Livingston. |
| 2,994,106 | 8/1961 | Posey _____ 18—5 X |
| 3,145,422 | 8/1964 | Daubenberger et al. |
| 3,156,749 | 11/1964 | Hosfield. |

FOREIGN PATENTS

| | | |
|---|---|---|
| 243,628 | 9/1960 | Australia. |

WILLIAM J. STEPHENSON, *Primary Examiner.*